J. O. FARRELL.
Plow.

No. 207,130.      Patented Aug. 20, 1878.

WITNESSES:
Henn. Lauten
Story B. Ladd

INVENTOR:
John O. Farrell
By Paine and Grafton
Attorneys

UNITED STATES PATENT OFFICE.

JOHN O. FARRELL, OF ATHENS, GEORGIA.

IMPROVEMENT IN PLOWS.

Specification forming part of Letters Patent No. 207,130, dated August 20, 1878; application filed May 4, 1878.

*To all whom it may concern:*

Be it known that I, JOHN O. FARRELL, of Athens, in the county of Clarke and State of Georgia, have invented certain new and useful Improvements in Plows; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of my invention is to provide a simple, strong, and easily-adjusted fastening for attaching the plow to the plow-beam; and the invention will be fully understood from the following description and claim.

Figure 1:
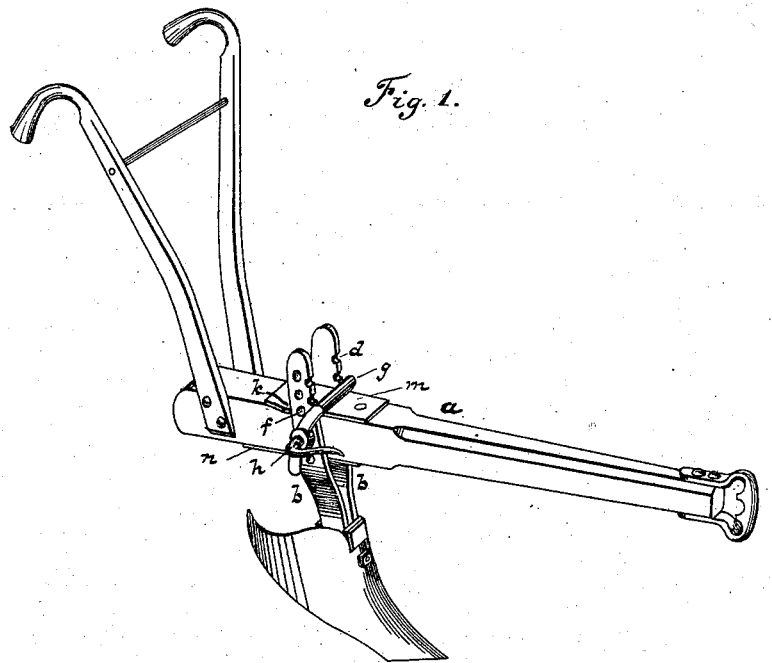
Figure 2:
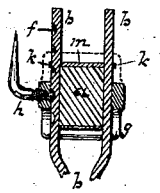

Figure 1 is a perspective view of a plow embodying my invention, and Fig. 2 is a vertical cross-section through the plow-standards.

The plow-beam $a$ is of the ordinary construction, and the plow-standard $b\ b$ belongs to the class of bifurcated standards, one branch passing up on each side of the plow-beam.

The front edges of the standards have the notches $d$, and in the side of one of them there is a line of countersinks, $f$, placed at regular intervals, for the purpose of regulating the depth of the plow, and at the same time permitting the standards to be firmly clamped by means of the stirrup $g$ and the set-screw $h$. The countersinks, in connection with the set-screw, serve the same purpose in supporting the standards that a bolt does which passes through the stirrup, standards, and plow-beam, and at the same time it permits the standards to be clamped against the plow-beam.

The stirrup $g$ is made solid, and it encircles the plow-beam diagonally, passing in front of the standards $b$ on the upper side of the beam, and behind them on the under side.

The point of the set-screw is placed in one of the countersinks and then firmly clamped, and the upper cross-bar of the stirrup then rests in one of the notches $d$, thus firmly binding and supporting the plow at the proper elevation, which is gaged by the countersinks $f$ and notches $d$.

Iron plates $m$ and $n$ are fastened to the upper and under sides of the plow-beam, respectively, and the top plate, $m$, has the lugs $k$, which form a bearing for the upper ends of the standard, and keep it always in the same relative position to the beam.

I am aware of the fact that plow-standards have been adjustably secured to the plow-beam by means of a collar placed diagonally around the beam and standard, and do not claim that, broadly, as my invention; but

What I claim as my invention, and desire to secure by Letters Patent, is—

The plow-standards $b$, provided with the countersinks $f$ and notches $d$, in combination with the stirrup $g$, set-screw $h$, and the plow-beam, substantially as described, and for the purpose set forth.

In testimony that I claim the foregoing as my own I affix my signature in presence of two witnesses.

JOHN O. FARRELL.

Witnesses:
 JAS. A. GRANT,
 JOHN CALVIN JOHNSON.